US009064425B2

(12) United States Patent
Kuo et al.

(10) Patent No.: US 9,064,425 B2
(45) Date of Patent: Jun. 23, 2015

(54) COLOR-BASED MUSIC OUTPUT SYSTEM AND METHOD THEREOF

(71) Applicant: National Chiao Tung University, Hsinchu (TW)

(72) Inventors: Yi-Ting Kuo, Hsinchu (TW); Ming-Chuen Chuang, Hsinchu (TW); Mang Ou-Yang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/161,463

(22) Filed: Jan. 22, 2014

(65) Prior Publication Data

US 2015/0107441 A1    Apr. 23, 2015

(30) Foreign Application Priority Data

Oct. 22, 2013    (TW) .............................. 102138108 A

(51) Int. Cl.
  *G09B 15/02*    (2006.01)
(52) U.S. Cl.
  CPC .............. *G09B 15/02* (2013.01); *G09B 15/026* (2013.01)
(58) Field of Classification Search
  CPC .................................................... G09B 15/026
  See application file for complete search history.

(56) References Cited

U.S. PATENT DOCUMENTS

| | | | | |
|---|---|---|---|---|
| 1,805,488 A * | 5/1931 | Jolls | ............................. | 84/471 R |
| 2,221,143 A * | 11/1940 | Lang | ............................... | 84/478 |
| 4,441,399 A * | 4/1984 | Wiggins et al. | ............. | 84/470 R |
| 5,563,358 A * | 10/1996 | Zimmerman | ............... | 84/477 R |
| 5,574,238 A | 11/1996 | Mencher | | |
| 6,008,551 A * | 12/1999 | Coray | ........................... | 307/157 |
| 6,124,540 A * | 9/2000 | Lotito | ......................... | 84/483.2 |
| 6,288,318 B1 * | 9/2001 | Chow | .............................. | 84/603 |
| 6,538,187 B2 | 3/2003 | Beigi | | |
| 6,791,568 B2 * | 9/2004 | Steinberg et al. | ............. | 345/600 |
| 6,987,220 B2 * | 1/2006 | Holcombe | ................... | 84/483.2 |
| 7,148,414 B2 * | 12/2006 | Kestenbaum et al. | ........ | 84/483.2 |
| 7,667,125 B2 * | 2/2010 | Taub et al. | ...................... | 84/616 |
| 8,294,016 B2 * | 10/2012 | Franzblau | ....................... | 84/609 |

(Continued)

OTHER PUBLICATIONS

C. Tobin, "Accelerating Music Literacy," http://www.tobinmusic.co.uk/content/index.html, pp. 1-12 (Oct. 21, 2012).

(Continued)

*Primary Examiner* — Robert W Horn
(74) *Attorney, Agent, or Firm* — Muncy, Geissler, Olds & Lowe, P.C.

(57) ABSTRACT

The present invention discloses a color-based music output system and a method thereof. The system of the present invention comprises a pickup unit receiving a musical signal; a recognition unit electrically connected with the pickup unit to receive the musical signal and recognizing musical elements from the musical signal; a conversion unit electrically with the recognition unit to receive the musical elements and converting the musical elements into colored musical notes; and a processing unit electrically connected with the pickup unit, the recognition unit and the conversion unit, receiving the colored musical notes, and outputting a colored musical notation corresponding to the colored musical notes. The present invention provides an easy-to-read colored musical notation to simplify the conventional five-line staff and overcome the disadvantages thereof and also provides an innovative color-based music output system to make users read musical notations easier.

18 Claims, 7 Drawing Sheets

(56) References Cited

U.S. PATENT DOCUMENTS

| | | | |
|---|---|---|---|
| 8,367,920 B2* | 2/2013 | Saxby | 84/483.2 |
| 8,878,040 B2* | 11/2014 | Araki et al. | 84/601 |
| 8,907,195 B1* | 12/2014 | Erol | 84/609 |
| 8,921,677 B1* | 12/2014 | Severino | 84/478 |
| 2002/0050206 A1 | 5/2002 | MacCutcheon | |
| 2002/0117043 A1* | 8/2002 | Powley | 84/483.2 |
| 2006/0137512 A1 | 6/2006 | Lassar | |
| 2007/0221043 A1 | 9/2007 | Hao | |

OTHER PUBLICATIONS

Szilvay Foundation, "Colourstrings and The Szilvay Foundation," http://www.colourstrings.co.uk/index.html, pp. 1-2 (Oct. 21, 2012).

Yi-Tung Kuo, "Color Music Notation System of Single Melody for Music Beginners," Thesis, National Chiao Tung University, Institute of Applied Arts, with English Abstract, pp. 1-2 (Jun. 19, 2013).

* cited by examiner

| color name | Red | Red-Orange | Orange | Orange-Yellow | Yellow | Yellow-Green |
|---|---|---|---|---|---|---|
| color | ○ | △ | ○ | △ | ○ | ○ |
| NCS color code | S1080-R | S0585-Y80R | S0585-Y60R | S0585-Y40R | S0580-Y | S1075-G50Y |
| CIELuv | (0.43, 0.97) | (0.42, 0.94) | (0.36, 0.81) | (0.31, 0.70) | (0.23, 0.52) | (0.19, 0.42) |
| Solfeggio syllable | Do | Do#/Reb | Re | Re#/Mib | Mi | Fa |
| color name | Green | Green-Blue | Blue | Blue-Violet | Violet | Violet-Red |
| color | △ | ○ | △ | ○ | △ | ○ |
| NCS color code | S1565-G | S2060-B50G | S1565-B | S2060-R70B | S3055-R50B | S2060-R30B |
| CIELuv | (0.13, 0.30) | (0.14, 0.31) | (0.15, 0.33) | (0.19, 0.42) | (0.26, 0.58) | (0.31, 0.69) |
| Solfeggio syllable | Fa#/Solb | Sol | Sol#/Lab | La | La#/Sib | Si |

Fig.2

| ppp | pp | p | mp | mf | f | ff | fff |
|---|---|---|---|---|---|---|---|
| · | • | • | • | ● | ● | ● | ● |

COLOR-BASED MUSIC OUTPUT SYSTEM AND METHOD THEREOF

This application claims priority for Taiwan patent application no. 102138108 filed on Oct. 22, 2013, the content of which is incorporated in its entirely.

BACKGROUND OF THE INVENTION

1. Field of the Invention

The present invention relates to a musical notation output technology, particularly to a color-based music output system and a method thereof, which can output an easy-to-read colored musical notation.

2. Description of the Related Art

From the middle ages through the renaissance, classical and romantic periods to modem times, the musical notation has gone through many evolutions, including the neumatic notation, the diastematic notation (the four-line staff), the klavarskribo notation, the graphic notation, the five-line staff, the numbered musical notation, and new musical notations. At present, the five-line staff and the numbered musical notation are widely used by people. The five-line staff is normally used in classical music performance and formal musical instructions. The numbered musical notation is usually used in popular music. The numbered music notation uses numbers to represent pitches and thus is easier to read than the five-line staff However, the two traditional musical notations still have their shortcomings. For example, the two traditional musical notations are only black-and-white and unable to fully exploit the color perception of human beings.

Nowadays, there have been musical notations using colors and forms to notate musical elements. However, they are regarded as insufficient of innovation because they are not systematically designed according to chromatics.

Accordingly, the present invention proposes a color-based music output system able to output an easy-to-read colored musical notation and a method thereof to overcome the abovementioned problems.

SUMMARY OF THE INVENTION

The primary objective of the present invention is to provide a color-based music output system and a method thereof, which can output an easy-to-read colored musical notation, and which simplifies musicography and integrates colors and forms to design an innovative colored musical notation system that is instinctive and easy to learn, read and memorize, whereby learners will take more interest in learning music and playing musical instruments.

Another objective of the present invention is to provide a color-based music output system and a method thereof, which can output colored lights or colored images according to music to boost mood and promote delight.

To achieve the abovementioned objectives, the present invention proposes a color-based music output system, which comprises a pickup unit receiving a musical signal; a recognition unit electrically connected with the pickup unit to receive the musical signal and recognizing the musical elements in the musical signal; a conversion unit electrically connected with the recognition unit to receive the musical elements and converting the musical elements into colored musical notes; and a processing unit electrically connected with the pickup unit, the recognition unit and the conversion unit, receiving the colored musical notes and outputting a colored musical notation corresponding to the colored musical notes.

The present invention also proposes a color-based music output method, which comprises steps: receiving a musical signal; recognizing musical elements from the musical signal; converting the musical elements into colored musical notes; and outputting a colored musical notation corresponding to the colored musical notes.

Below, the embodiments are described in detail to make easily understood the objectives, technical contents, characteristics and accomplishments of the present invention.

BRIEF DESCRIPTION OF THE DRAWINGS

FIG. 2 shows a table for conversion of pitch representation according to one embodiment of the present invention;

DETAILED DESCRIPTION OF THE INVENTION

In one embodiment, the color-based music output system of the present invention outputs a colored musical notation corresponding to a traditional five-line staff. The colored musical notation features the colors and forms thereof. The present invention utilizes the synaesthesia between the stimulus of the light frequencies of colors and the stimulus of the vibration frequencies of sounds to improve the effects of music learning, sight-playing and sight-singing, whereby the leaner can easily read the colored musical notation of the present invention via instinctively and fast recognizing the colors and forms of the colored musical notation while playing a musical instrument or singing a song, wherefore the present invention can reduce the barrier of reading musical notations and enhance the effect of learning and memorizing musical notations.

Figure 1:
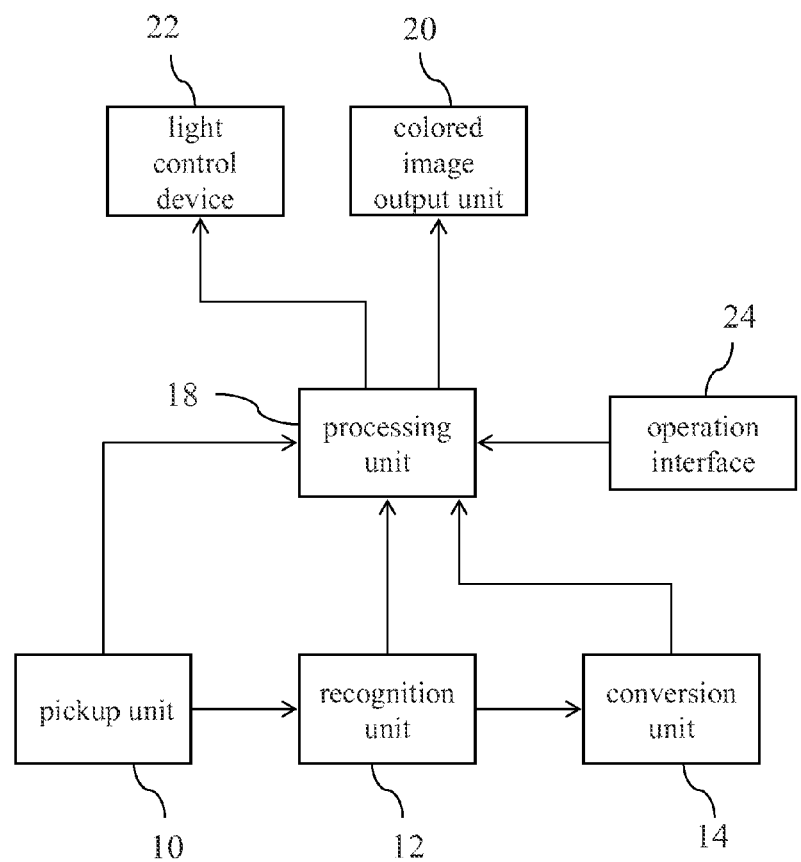
FIG. 1 is a block diagram schematically showing a color-based music output system according to one embodiment of the present invention.

Refer to FIG. 1 for the architecture of a color-based music output system according to one embodiment of the present invention. In this embodiment, the color-based music output system comprises a pickup unit 10 receiving a musical signal, which may be a musical notation or a melody; a recognition unit 12 electrically connected with the pickup unit 10 to receive the musical signal and recognizing musical elements from the musical signal, wherein the musical elements include the musical elements appearing on a musical staff, such as the tonic, whole notes, half notes, quarter notes, fortes, pianos, etc.; a conversion unit 14 electrically connected with the recognition unit 12 to receive the musical elements and converting the musical elements into colored musical notes; and a processing unit 14 electrically connected with the pickup unit 10, the recognition unit 12 and the conversion unit 14, receiving the colored musical notes, and outputting a colored musical notation corresponding to the colored musical notes. In one embodiment, the present invention further comprises a colored image output unit 20 electrically connected with the processing unit 18 to receive the colored musical notes and outputting colored images corresponding to the colored musical notes. In one embodiment, the present invention further comprises a light control device 22 electrically connected with the processing unit 18 to receive the colored musical notation, generating colored lights according to the colored musical notation, and varying the colored lights according to the melody of the musical signal. In one embodiment, the present invention further comprises an operation interface 24 electrically connected with the processing unit 18 and operated by the user to play music or control the lights of the light control device 22.

The relationship between the colored musical notes of the present invention and the conventional five-line staff is shown in FIG. 2, wherein the colored musical notes are shown together with the corresponding solfeggio syllables, and wherein the colored musical notes are expressed by geometrical figures filled with gray-level patterns. Please refer to Appendix I for the actual colors of the colored musical notes, wherein the whole tone Do has a color of red; the semitone between the whole tone Do and the whole tone Re has a color of red-orange; the whole tone Re has a color of orange; the semitone between the whole tone Re and the whole tone Mi has a color of orange-yellow; the whole tone Mi has a color of yellow; the whole tone Fa has a color of yellow-green; the semitone between the whole tone Fa and the whole tone Sol has a color of green; the whole tone Sol has a color of green-blue; the semitone between the whole tone Sol and the whole tone La has a color of blue; the whole tone La has a color of blue-violet; the semitone between the whole tone La and the whole tone Si has a color of violet; the whole tone Si has a color of violet-red. Besides, the whole tone is denoted by a circle, and the semitone is denoted by a triangle.

In one embodiment, the abovementioned colors are defined by the NCS (Natural Color System) color code. In the NCS color code, the color of red is defined by S1080-R; the color of red-orange is defined by S0585-Y80R; the color of orange is defined by S0585-Y60R; the color of orange-yellow is defined by S0585-Y40R; the color of yellow is defined by S0580-Y; the color of yellow-green is defined by S1075-G50Y; the color of green is defined by S1565-G; green-blue by S2060-B; the color of blue is defined by S1565-B; the color of blue-violet is defined by S2060-R70B; the color of violet is defined by S3055-R50B; the color of violet-red is defined by S2060-R30B.

In one embodiment, the abovementioned colors are defined by the coordinates of the CIELuv color space (a color space adopted by the international commission on illumination (CIE) in 1976). In the CIELuv color space, the color of red is defined by (0.43, 0.97); red-orange is defined by (0.42, 0.94); orange is defined by (0.36, 0.81); orange-yellow is defined by (0.31, 0.70); yellow is defined by (0.23, 0.52); yellow-green is defined by (0.19, 0.42); green is defined by (0.13, 0.30); green-blue is defined by (0.14, 0.31); blue is defined by (0.15, 0.33); blue-violet is defined by (0.19, 0.42); violet is defined by (0.26, 0.58); violet-red is defined by (0.31, 0.69).

Figure 3:
FIG. 3 shows the way to notate a middle note and notes higher than the middle note according to one embodiment of the present invention.

The colored musical notes not only have to express pitches of musical notes but also have to express how many octaves a note is away from the middle note. The symbols expressing how many octaves the note is away from the middle note are shown in FIG. 3. In FIG. 3, a dot is added to the top of the colored musical note one octave above the middle note; 2 dots are added to the top of the colored musical note two octaves above the middle note; 3 dots added to the top of the colored musical note three octaves above the middle note; the successive symbols are generated according to the same rule. In FIG. 3, a dot is added to the bottom of the colored musical note one octave below the middle note; 2 dots are added to the bottom of the colored musical note two octaves below the middle note; 3 dots added to the bottom of the colored musical note 3 octaves below the middle note; the successive symbols are generated according to the same rule.

Figures 4, 5:
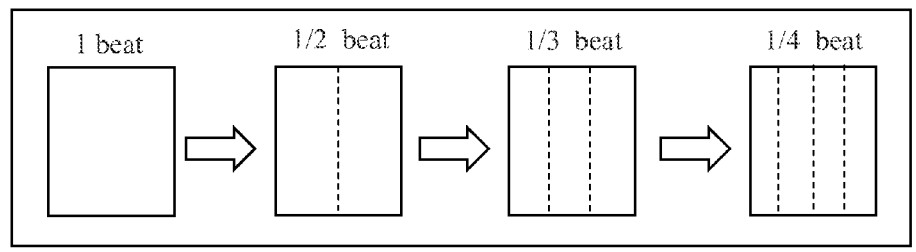
FIG. 4 shows the way to notate beats of musical notes according to one embodiment of the present invention.
FIG. 5 shows the way to notate dynamics of musical notes according to one embodiment of the present invention.
Figure 6:
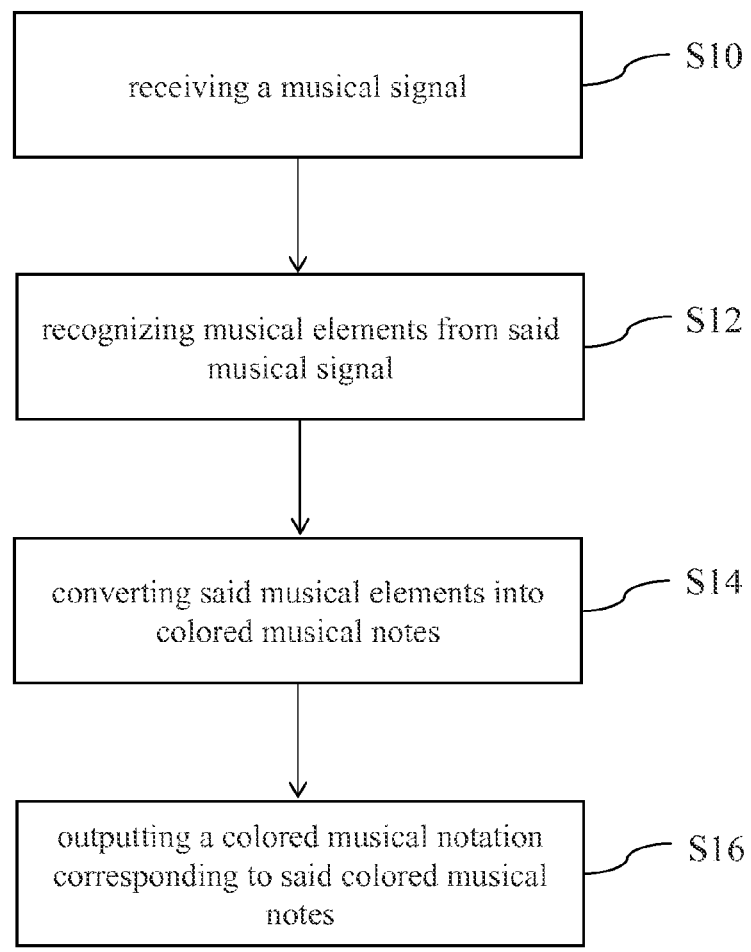
FIG. 6 is a flowchart of a color-based music output method according to one embodiment of the present invention.

The staff has a meter to stabilize the rhythm. Therefore, the beat of each musical note is also notated in the colored musical notation of the present invention. Refer to FIG. 4. The beats of the colored musical notes are defined by beat-count squares. For example, 1 beat-count square denotes the beat of 1 quarter note. In other words, 1 quarter note has 1 beat. Each beat-count square can be divided to accommodate colored musical notes having different counts of beats. For example, while an eighth note is converted into a colored musical note, the beat-count square is divided into two small squares each equal to half a beat and each accommodating a colored musical note converted from an eighth note.

A staff normally has a forte symbol or a piano symbol to indicate the dynamics of the musical notes and present the emotions implied in the musical notation. Refer to FIG. 5 showing the symbols of fortes and pianos. In FIG. 5, the increasing sizes of the colored musical notes are used to notate the increasing dynamics of fortes (mf, f, ff, and fff); the decreasing sizes of the colored musical notes are used to notate the decreasing dynamics of pianos (mp, p, pp, and ppp).

The color-based music output system of the present invention has been exemplified by the embodiments hereinbefore. The color-based music output method of the present invention will be described below. Refer to FIG. 1, and FIGS. 6-8. The method of the present invention comprises four steps: Step S10, Step S12, Step S14 and Step S16. In Step S10, a pickup unit 10 receives a musical signal, which is a musical notation or a melody. For example, the musical signal is a five-line staff of a children's song "Lightly Row" shown in FIG. 7. In Step S12, a recognition unit 12 recognizes musical elements from the five-line staff of "Lightly Row", such as wholes notes, half notes, quarter notes, the tonic, pitches, dynamics, and beats. In the first bar of the five-line staff, there are whole notes of Sol, Mi, Mi, which are respectively a quarter note, a quarter note and a half note. The note of Sol is forte (f), and the latter two notes of Mi are mezzo-piano (mp). In Step S14, a conversion unit 14 converts the musical signal into colored musical notes according to the musical elements of the musical signal. In FIG. 8, geometrical figures filled with gray-level forms are used to denote colored musical notes of different colors. In the first bar, the notes of Sol, Mi, Mi are converted into colored musical notes: circles respectively filled with colors of blue green, yellow, and yellow. The colored musical notes are respectively placed into the beat-count squares corresponding to the counts of their beats. As 1 beat-count square denotes a quarter note, the quarter notes of green-blue color and yellow color are respectively placed into two different beat-count squares, and the half note of yellow color occupies two beat-count squares. The sizes of the circles are varied according to their dynamics (f and mp). In Step S16, a processing unit 18 outputs the colored musical notes shown in FIG. 8, wherein the tempo and meter are designated at the upper left of the colored musical notation.

Figure 7:
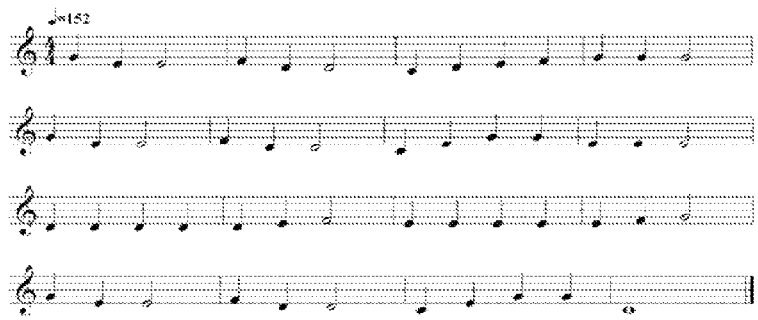
FIG. 7 shows a conventional musical notation.
Figure 8:
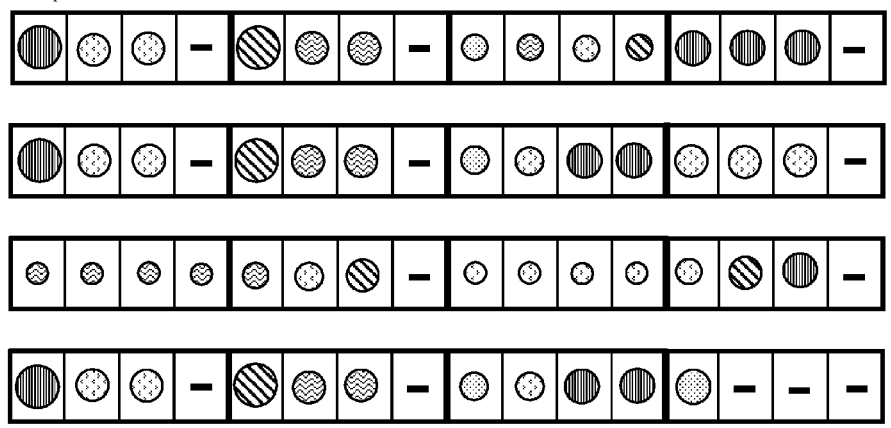
FIG. 8 schematically shows a colored musical notation according to one embodiment of the present invention.
Figure 9:
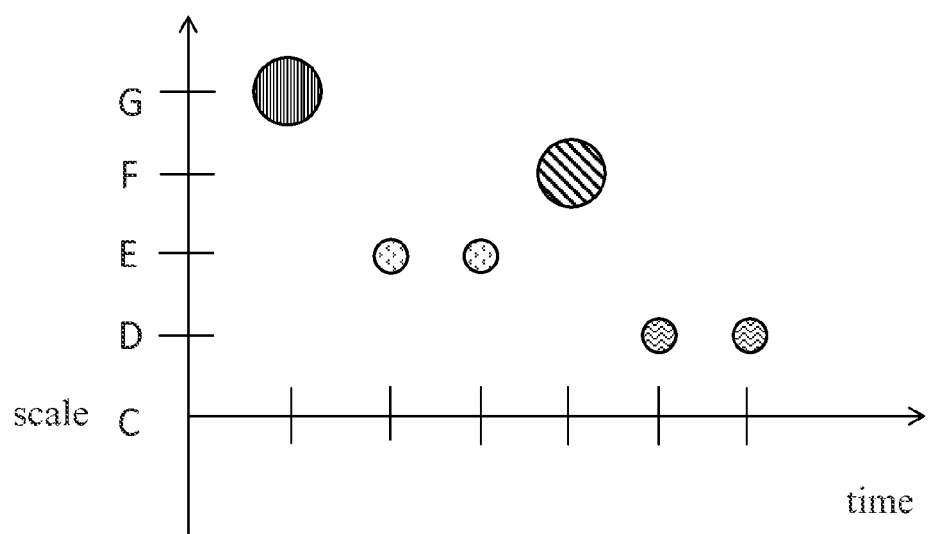
FIG. 9 schematically shows a colored image according to one embodiment of the present invention.

Refer to FIG. 7 and FIG. 9. In addition to the colored musical notation, the color-based music output system of the present invention can also output colored images or output lights of different colors corresponding to the colored musical notes. FIG. 9 schematically shows an embodiment of colored images output by the system of the present invention, wherein the X axis represents time and Y axis represents the scale. In the coordinate system shown in FIG. 9, the colored musical notes of Sol, Mi, Mi, Fa, Re, Re of Lightly Row respectively appear at their pitches along the time axis.

In conclusion, the system of the present invention outputs an easy-to-read colored musical notation to simplify the conventional five-line staff and overcome the disadvantages thereof, wherein colors and forms are integrated to develop an innovative colored musical notation that is instinctive, easy to read, easy to learn, and easy to memorize, whereby learners will take more interest in learning music and playing musical instruments. Further, the system of the present invention can also output colored lights or colored images according to music to boost mood and promote delight.

The embodiments described above are only to exemplify the present invention but not to limit the scope of the present invention. Any equivalent modification or variation according to the characteristic or spirit of the present invention is to be also included within the scope of the present invention.

What is claimed is:

1. A color-based music output system comprising
    a pickup unit receiving a musical signal;
    a recognition unit electrically connected with said pickup unit to receive said musical signal and recognizing musical elements from said musical signal;
    a conversion unit electrically with said recognition unit to receive said musical elements and converting said musical elements into colored musical notes; and
    a processing unit electrically connected with said pickup unit, said recognition unit and said conversion unit, receiving said colored musical notes, and outputting a colored musical notation corresponding to said colored musical notes, wherein
    said musical elements include a tonic, whole notes, half notes, quarter notes, fortes and pianos, and
    sizes of said colored musical notes are increased with increasing dynamic of said fortes; sizes of said colored musical notes are decreased with decreasing dynamics of said pianos.

2. The color-based music output system according to claim 1, wherein said musical signal is a musical notation or a melody.

3. The color-based music output system according to claim 1, wherein different colors are respectively assigned to whole tones and semitones of said colored musical notation, and wherein a whole tone Do has a color of red; a semitone between said whole tone Do and a whole tone Re has a color of red-orange; said whole tone Re has a color of orange; a semitone between said whole tone Re and a whole tone Mi has a color of orange-yellow; said whole tone Mi has a color of yellow; a whole tone Fa has a color of yellow-green; a semitone between said whole tone Fa and a whole tone Sol has a color of green; said whole tone Sol has a color of blue-green; a semitone between said whole tone Sol and a whole tone La has a color of blue; said whole tone La has a color of blue-violet; a semitone between said whole tone La and a whole tone Si has a color of violet; said whole tone Si has a color of violet-red.

4. The color-based music output system according to claim 1, wherein each said whole tone is denoted by a circle, and each said semitone is denoted by a triangle.

5. The color-based music output system according to claim 1, wherein a dot is added to a top of one said colored musical note higher than said middle note by 1 octave; a dot is added to a bottom of one said colored musical note lower than said middle note by 1 octave.

6. The color-based music output system according to claim 1, wherein said colored musical notation includes a plurality of beat-count squares; each said beat-count square denotes a beat of a quarter note; each said beat-count square can be divided into a plurality of squares each accommodating one said colored musical note having a corresponding count of beats.

7. The color-based music output system according to claim 1 further comprising a colored image output unit electrically connected with said processing unit and outputting colored images according to said colored musical notes.

8. The color-based music output system according to claim 1 further comprising a light control device electrically connected with said processing unit and generating different colored lights according to said colored musical notes.

9. The color-based music output system according to claim 1 further comprising an operation interface electrically connected with said processing unit and operated by users.

10. A color-based music output method comprising steps:
    receiving a musical signal;
    recognizing musical elements from said musical signal;
    converting said musical elements into colored musical notes; and
    outputting a colored musical notation corresponding to said colored musical notes, wherein
    said musical elements include a tonic, whole notes, half notes, quarter notes, fortes and pianos, and
    sizes of said colored musical notes are increased with increasing dynamics said fortes;
    sizes of said colored musical notes are decreased with decreasing dynamics of said pianos.

11. The color-based music output method according to claim 10, wherein said musical signal is a musical notation or a melody.

12. The color-based music output method according to claim 10, wherein different colors are respectively assigned to whole tones and semitones of said colored musical notation, and wherein a whole tone Do has a color of red; a semitone between said whole tone Do and a whole tone Re has a color of red-orange; said whole tone Re has a color of orange; a semitone between said whole tone Re and a whole tone Mi has a color of orange-yellow; said whole tone Mi has a color of yellow; a whole tone Fa has a color of yellow-green; a semitone between said whole tone Fa and a whole tone Sol has a color of green; said whole tone Sol has a color of blue-green; a semitone between said whole tone Sol and a whole tone La has a color of blue; said whole tone La has a color of blue-violet; a semitone between said whole tone La and a whole tone Si has a color of violet; said whole tone Si has a color of violet-red.

13. The color-based music output method according to claim 12, wherein said colors are defined by an NCS (Natural Color System) color code, and wherein said color of red is defined by S1080-R; said color of red-orange is defined by S0585-Y80R; said color of orange is defined by S0585-Y60R; said color of orange-yellow is defined by S0585-Y40R; said color of yellow is defined by S0580-Y; said color of yellow-green is defined by S1075-G50Y; said color of green is defined by S1565-G, green-blue by S2060-B; said color of blue is defined by S1565-B; said color of blue-violet is defined by S2060-R70B; said color of violet is defined by S3055-R50B; said color of violet-red is defined by S2060-R30B.

14. The color-based music output method according to claim 10, wherein each said whole tone is denoted by a circle, and each said semitone is denoted by a triangle.

15. The color-based music output method according to claim 10, wherein a dot is added to a top of one said colored musical note higher than said middle note by 1 octave; a dot is added to a bottom of one said colored musical note lower than said middle note by 1 octave.

16. The color-based music output method according to claim 10, wherein said colored musical notation includes a plurality of beat-count squares; each said beat-count square can be divided into a plurality of squares each accommodating one said colored musical note having a corresponding count of beats.

17. The color-based music output method according to claim 10, wherein said step of converting said musical elements into colored musical notes further comprising a step:
   outputting colored images according to said colored musical notes.

18. The color-based music output method according to claim 10, wherein said step of converting said musical elements into colored musical notes further comprising a step: generating different colored lights according to said colored musical notes.

* * * * *